United States Patent
Han et al.

(10) Patent No.: US 9,722,242 B2
(45) Date of Patent: Aug. 1, 2017

(54) HOLLOW SILICON-BASED PARTICLE, PREPARATION METHOD THEREOF AND ANODE ACTIVE MATERIAL FOR LITHIUM SECONDARY BATTERY INCLUDING THE SAME

(71) Applicant: LG Chem, Ltd., Seoul (KR)

(72) Inventors: Gi Beom Han, Daejeon (KR); Hong Kyu Park, Daejeon (KR); Wang Mo Jung, Daejeon (KR); Sung Joong Kang, Daejeon (KR); Chi Ho Jo, Daejeon (KR); Ji Hoon Ryu, Daejeon (KR)

(73) Assignee: LG Chem, Ltd. (KR)

( * ) Notice: Subject to any disclaimer, the term of this patent is extended or adjusted under 35 U.S.C. 154(b) by 146 days.

(21) Appl. No.: 14/464,802

(22) Filed: Aug. 21, 2014

(65) Prior Publication Data

US 2014/0356726 A1    Dec. 4, 2014

Related U.S. Application Data

(63) Continuation of application No. PCT/KR2014/004370, filed on May 15, 2014.

(30) Foreign Application Priority Data

May 16, 2013  (KR) .................. 10-2013-0055885

(51) Int. Cl.
*H01M 4/134* (2010.01)
*H01M 4/38* (2006.01)
(Continued)

(52) U.S. Cl.
CPC ........... *H01M 4/386* (2013.01); *H01M 4/485* (2013.01); *H01M 4/625* (2013.01); *H01M 4/366* (2013.01); *H01M 10/052* (2013.01)

(58) Field of Classification Search
CPC .... H01M 10/052; H01M 4/366; H01M 4/386; H01M 4/485; H01M 4/625
(Continued)

(56) References Cited

U.S. PATENT DOCUMENTS

2003/0031856 A1    2/2003  Hareyama et al.
2005/0244322 A1*  11/2005  Chen ..................... C01B 33/113
                                                                 423/335
(Continued)

FOREIGN PATENT DOCUMENTS

CN    102145890         8/2011
CN    103094538  A      5/2013
(Continued)

OTHER PUBLICATIONS

Yang Su, "Synthesis of Hierarchical Hollow Silica Microspheres Containing Surface Nanoparticles Employing the Quasi-Hard Template of Poly(4-vinylpyridine) Microspheres", Langmuir, 2011, 27 (14), pp. 8983-8989.*

(Continued)

*Primary Examiner* — Jonathan Jelsma
*Assistant Examiner* — Rashid Alam
(74) *Attorney, Agent, or Firm* — Lerner, David, Littenberg, Krumholz & Mentlik, LLP (57) ABSTRACT

A hollow silicon-based particle including silicon (Si) or silicon oxide ($SiO_x$, $0<x<2$) particle including a hollow core part therein, wherein a size of the hollow core part is from 5 nm to 45 μm, and a novel preparation method thereof are provided. Hollow is formed in the silicon-based particle, and volume expansion to the inward/outward of the silicon-based particle may be induced. Thus, the volume expansion of the silicon-based particle to the outward may be decreased, and the capacity properties and the life characteristics of a lithium secondary battery may be improved.

(Continued)

According to the novel preparation method of the hollow silicon-based particle of the present invention, mass production is possible, producing rate is faster when compared to a common chemical vapor deposition (CVD) method or a vapor-liquid-solid (VLS) method, and the preparation method of the present invention is favorable when considering processes and safety.

14 Claims, 6 Drawing Sheets

(51) Int. Cl.
    *H01M 4/485* (2010.01)
    *H01M 4/62* (2006.01)
    *H01M 4/36* (2006.01)
    *H01M 10/052* (2010.01)
(58) Field of Classification Search
    USPC .................................................. 429/231.8
    See application file for complete search history.

(56) References Cited

U.S. PATENT DOCUMENTS

| | | | |
|---|---|---|---|
| 2007/0036705 A1* | 2/2007 | Butts .................... | C01B 33/18 423/335 |
| 2007/0036736 A1* | 2/2007 | Kalla ..................... | A61K 8/11 424/63 |
| 2009/0305135 A1* | 12/2009 | Shi ........................ | B82Y 30/00 429/217 |
| 2012/0026644 A1* | 2/2012 | Dunn .................... | H01G 11/46 361/502 |
| 2012/0328943 A1 | 12/2012 | Mah et al. | |
| 2013/0059203 A1 | 3/2013 | Hong et al. | |
| 2013/0078490 A1 | 3/2013 | Morita et al. | |
| 2013/0115517 A1 | 5/2013 | Kim et al. | |
| 2013/0189575 A1* | 7/2013 | Anguchamy ......... | H01M 4/134 429/211 |
| 2013/0295439 A1* | 11/2013 | Masarapu ............ | H01M 4/485 429/163 |
| 2013/0302675 A1 | 11/2013 | Kouzu et al. | |
| 2014/0166929 A1 | 6/2014 | Takeuchi et al. | |
| 2014/0272573 A1* | 9/2014 | Xiao ..................... | H01M 4/049 429/217 |
| 2014/0287317 A1 | 9/2014 | Tiquet et al. | |

FOREIGN PATENT DOCUMENTS

| | | |
|---|---|---|
| JP | H06-142491 A | 5/1994 |
| JP | 2001229733 A | 8/2001 |
| JP | 2001283848 A | 10/2001 |
| JP | 2002042806 A | 2/2002 |
| JP | 2002151066 A | 5/2002 |
| JP | 2007123100 A | 5/2007 |
| JP | 2009032693 A | 2/2009 |
| JP | 2013030405 A | 2/2013 |
| JP | 2013073764 A | 4/2013 |
| KR | 2005-0083489 A | 8/2005 |
| KR | 2008-0028992 A | 4/2008 |
| KR | 2009-0077159 A | 7/2009 |
| KR | 2012-0056337 A | 6/2012 |
| TW | 201230475 A | 7/2012 |
| WO | 2010/138617 A2 | 12/2010 |
| WO | 2013/060790 A1 | 5/2013 |

OTHER PUBLICATIONS

Yan, Nan et al., "Hollow Porous SiO2 Nanocubes Towards High-performance Anodes for Lithium-ion Batteries, Scientific Reports," Mar. 2013, vol. 3, No. 1568, pp. 1-6.
International Search Report from PCT/KR2014/004370, dated Aug. 21, 2014.
Extended Search Report from corrsponding European Appln. No. 14789764, dated Jun. 1, 2015.
Jian Yang, et al., "Synthesis of Hollow Silica and Titania Nanospheres" Chemistry of Materials, vol. 20, No. 9, pp. 2875-2877 (Apr. 18, 2008).
Min Chen, et al., "A Method for the Fabrication of Monodisperse Hollow Silica Spheres." Advanced Materials, vol. 18, No. 6, pp. 801-806 (Mar. 7, 2013).
Yingqing Wang, et al., "Synthesis of Submicrometer Hollow Particles with a Nanoscale Double-Layer Shell Structure." Langmuir, 2012, vol. 28(39), pp. 13783-13787.

* cited by examiner

HOLLOW SILICON-BASED PARTICLE, PREPARATION METHOD THEREOF AND ANODE ACTIVE MATERIAL FOR LITHIUM SECONDARY BATTERY INCLUDING THE SAME

CROSS-REFERENCE TO RELATED APPLICATIONS

This present application is continuation of International Application No. PCT/KR2014/004370 filed on May 15, 2014 which claims the benefit of Korean Patent Application No. 10-2013-0055385 filed on May 16, 2013 in the Koren Intellectual Property Office, the disclosure of which is incorporated herein by reference.

BACKGROUND OF THE INVENTION

Field of the Invention

The present invention relates to a hollow silicon-based particle, a preparation method thereof and an anode active material for a lithium secondary battery including the same.

Description of the Related Art

Lithium secondary batteries recently receiving attention as power sources of portable and small electronic devices is a battery using an organic electrolyte and having high energy density exhibiting higher discharge voltage by twice or more than that of a common battery using an alkaline aqueous solution.

As an anode material of a lithium secondary battery, graphite is widely used, however graphite has small capacity per unit weight of 372 mAh/g, and thus, the manufacture of a lithium secondary battery having high capacitance is difficult.

An anode active material exhibiting higher capacitance than graphite, that is, a material (a lithium alloying material) forming an alloy with lithium electrochemically, such as silicon, tin, an oxide thereof, etc. exhibits high capacity of greater than or equal to about 1,000 mAh/g and low charge and discharge voltage of 0.3 to 0.5 V. Thus, the material receives attention as an anode active material for a lithium secondary battery.

However, the above-described material has the defect of inducing the change of a crystalline structure and increasing volume during forming an alloy with lithium electrochemically. In this case, physical contact loss may occur between electrode active materials formed by coating a powder or between an electrode active material and a current collector during charge and discharge, and the capacity decrease of a lithium secondary battery according to the progress of charge and discharge cycle may be great.

Therefore, for the manufacture of a lithium secondary battery having high capacity, the development of a novel silicon material that may effectively control the volume change is required, and an anode having good capacity, efficiency, and cycle life characteristics and replaceable with a common anode is necessary.

SUMMARY OF THE INVENTION

An aspect of the present invention provides a hollow silicon-based particle producing a lithium secondary battery having improved capacity properties and life characteristics by minimizing the volume expansion of the silicon-based particle.

Another aspect of the present invention provides a method for preparing the hollow silicon-based particle.

Another aspect of the present invention provides an anode active material and an anode including the hollow silicon-based particle.

Another aspect of the present invention provides a lithium secondary battery including the anode.

According to an aspect of the present invention, there is provided a hollow silicon-based particle including silicon (Si) or silicon oxide ($SiO_x$, $0<x<2$) particle including a hollow core part therein, wherein a size of the hollow core part is from 5 nm to 45 µm.

According to another aspect of the present invention, there is provided a method for preparing the hollow silicon-based particle including the steps of i) preparing a polymer template, ii) coating a surface of the polymer template with $SiO_2$ using a silicon-based precursor, iii) obtaining hollow $SiO_2$ particle by removing the polymer template, and iv) obtaining hollow silicon (Si) or silicon oxide (SiOx, $0<x<2$) by reducing the hollow $SiO_2$ particle using an alkaline metal or an alkaline earth metal and acid treating the resultant product.

According to another aspect of the present invention, there is provided a hollow silicon-based particle prepared by the above preparation method.

Further, according to another aspect of the present invention, there is provided an anode active material, an anode and a lithium secondary battery including the hollow silicon-based particle.

According to an embodiment of the present invention, hollow is formed in the silicon-based particle, and the volume expansion may be directed in the inner portion of the silicon-based particle, and the volume expansion to the outward of the silicon-based particle may be restrained. Thus, the capacity properties and the life characteristics of a lithium secondary battery may be improved.

The hollow silicon-based particle according to another embodiment of the present invention further includes a first carbon coating layer on the inner wall of the particle, and so, mechanical properties may be reinforced, and the particle structure during rolling may be maintained stably.

The hollow silicon-based particle according to another embodiment of the present invention further includes a carbon coating layer on the outer wall of the particle, or on the inner and outer wall of the particle, and so, mechanical properties may be reinforced, good electrical conductivity may be imparted even after the expansion of an electrode during progressing charge and discharge, and side reaction with an electrolyte is restrained, thereby further improving the performance of a lithium secondary battery.

In addition, according to the novel method for preparing the hollow silicon-based particle of the present invention, mass production is possible and producing rate is faster when compared to a common chemical vapor deposition (CVD) method or a vapor-liquid-solid (VLS) method, and the method of the present invention is favorable when considering processes and safety.

BRIEF DESCRIPTION OF THE DRAWINGS

The accompanying drawings illustrate preferred embodiments of the present invention and are included to provide a further understanding of the present invention. The present invention may, however, be embodied in different forms and should not be construed as limited to the accompanying drawings.

DETAILED DESCRIPTION OF THE PREFERRED EMBODIMENT

Exemplary embodiments of the present invention will now be described in detail with reference to the accompanying drawings.

Here, it will be further understood that terms, such as those defined in commonly used dictionaries, should be interpreted as having a meaning that is consistent with their meaning in the context of the relevant art and will not be interpreted in an idealized or overly formal sense unless expressly so defined herein.

The hollow silicon-based particle according to an embodiment of the present invention include silicon (Si) or silicon oxide ($SiO_x$, 0<x<2) particle having hollow core parts therein, and the size of the hollow core part is from 5 nm to 45 μm.

In general, a silicon-based material exhibits high capacity properties when compared to a carbon-based material, however, induces the change of a crystal structure during absorbing and storing lithium and causes the volume expansion thereof. When the silicon-based material absorbs and stores maximum amount of lithium, the lithium, may be converted into $Li_{4.4}Si$, and the volume expansion may be generated due to charge. In this case, the increasing ratio of the volume due to charge may be about 4.12 times of the silicon volume before the volume expansion.

Since hollow is formed in the silicon-based particle according to an embodiment of the present invention, the volume expansion may be directed in the inner portion of the silicon-based particle. Thus, the volume expansion to the outward of the silicon-based particle may be minimized, and the capacity properties and the life characteristics of a lithium secondary battery may be improved.

In the hollow silicon-based particle according to an embodiment of the present invention, the silicon-based particle may be silicon (Si) or silicon oxide ($SiO_x$, 0<x<2) particle.

In the hollow silicon-based particle according to an embodiment of the present invention, the size of the hollow core part may be from 5 nm to 45 μm, and may preferably be from 100 nm to 10 μm. The size of the hollow core part may mean the diameter of the hollow.

In the case that the diameter of the hollow core part is less than 5 nm, the size of the hollow is too small, and the expansion rate of the hollow silicon-based particle to outward during charge and discharge may be relatively great, and the decreasing effect of the volume expansion of the silicon-based particle on the whole may be insignificant. In the case that the diameter of the hollow core part exceeds 45 μm, the diameter of the hollow core part may increase, and the particle size of the hollow silicon-based particle may increase on the whole. In this case, the binding properties between particle and between particle and an electrode collector may be deteriorated according to the repetition of the charge and discharge of a lithium secondary battery, thereby deteriorating cycle properties.

In addition, the diameter of the hollow silicon-based particle according to an embodiment of the present invention on the whole is from 10 nm to 50 μm, and preferably is from 100 nm to 15 μm. In the hollow silicon-based particle, the diameter of the silicon oxide particle is as small as possible to maximize the disordering of the expanding direction of each of the particle to prevent the expansion of the particle due to the charge of lithium ions. In the case that the diameter of the hollow silicon-based particle on the whole exceeds 50 μm, the expansion becomes severe, and the binding properties between the particle and between the particle and the current collector may be deteriorated according to the repetition of charge and discharge, thereby markedly decreasing cycle properties.

The hollow silicon-based particle according to an embodiment of the present invention may further include a first carbon coating layer on the inner wall of the silicon (Si) or silicon oxide ($SiO_x$, 0<x<2) particle.

According to an embodiment of the present invention, mechanical properties of the particle may be reinforced through the further inclusion of the first carbon coating layer on the inner wall of the silicon (Si) or silicon oxide ($SiO_x$, 0<x<2) particle. Thus, the particle may not be broken or deformed by rolling and may maintain the particle structure and the properties thereof stably.

The thickness of the first carbon coating layer is from 5 nm to 100 nm, and preferably is from 5 nm to 50 nm. The thickness of the first coating layer is required to be smaller than the radius of the hollow. In the case that the thickness of the first carbon coating layer exceeds 100 nm, the inducing effect of the volume expansion in the inner direction of the hollow during charge and discharge may be insignificant.

According to an embodiment of the present invention, carbon may be partially included in the silicon or silicon oxide particle in the hollow silicon-based particle, and the amount of the carbon may be about 0 wt % to 5 wt % with respect to the total amount of the hollow silicon-based particle.

In addition, the hollow silicon-based particle including the first carbon coating layer formed on the inner wall of the particle may include about 5 wt % to 50 wt % of the carbon with respect to the total amount of the hollow silicon-based particle.

The hollow silicon-based particle according to an embodiment of the present invention may further include a second carbon coating layer on the outer wall of the silicon (Si) or silicon oxide ($SiO_x$, 0<x<2) particle.

According to an embodiment of the present invention, mechanical properties of the particle may be reinforced through the further inclusion of the second carbon coating layer on the outer wall of the silicon (Si) or silicon oxide ($SiO_x$, 0<x<2) particle. Thus, the mechanical properties of the particle may be reinforced, and the particle may not be broken or deformed by rolling and may maintain the particle structure and the properties thereof stably. In addition, since the carbon coating layer having good conductivity is present on the outer wall of the particle, electrical conductivity thereof may be further improved.

The thickness of the second carbon coating layer is from 5 nm to 100 nm, and preferably is from 5 nm to 50 nm. In the case that the thickness of the second carbon coating layer is less than 5 nm, the increasing effect of the electrical conductivity due to the carbon coating layer may be insignificant, and reactivity thereof with an electrolyte may be high when applied in an active material, thereby deteriorating initial efficiency. In the case that the thickness of the second carbon coating layer exceeds 100 nm, the thickness of the amorphous carbon coating layer is too large, the movement of lithium ions may be inhibited, and resistance may increase. In addition, the surface of the particle may be hardened, and the manufacturing process of an electrode may be difficult.

The hollow silicon-based particle according to an embodiment of the present invention may include a first carbon coating layer on the inner wall of the silicon (Si) or silicon oxide ($SiO_x$, 0<x<2) particle, and may further include a second carbon coating layer on the outer wall thereof.

The total carbon content of the first carbon coating layer and the second carbon coating layer formed on the inner wall and the outer wall of the silicon (Si) or silicon oxide ($SiO_x$, 0<x<2) particle may be from about 0.5 wt % to about 70 wt % with respect to the total amount of the hollow silicon-based particle.

According to an embodiment of the present invention, the silicon (Si) or silicon oxide ($SiO_x$, 0<x<2) particle include the carbon coating layer on both of the inner wall and the outer wall thereof, and mechanical properties may be reinforced and good conductivity may be imparted. In addition, the side reaction with an electrolyte may be restrained, and the performance of the lithium secondary battery may be further improved.

Figure 1:
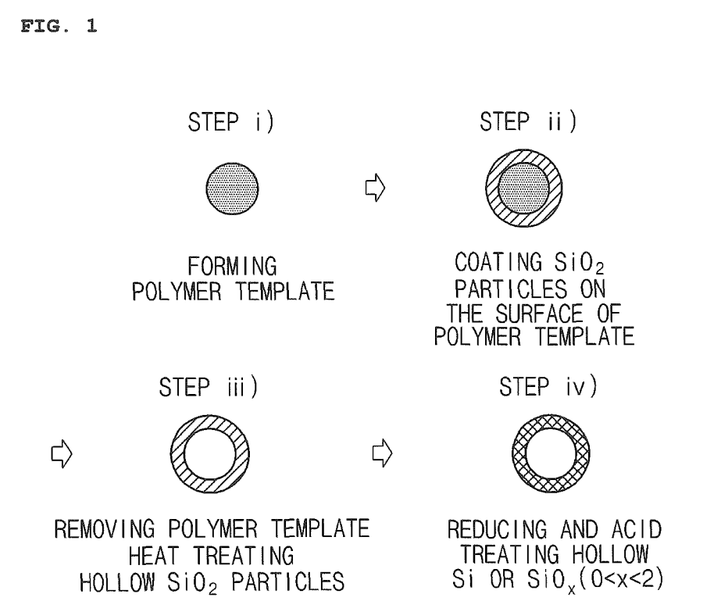
FIG. 1 illustrates a method for preparing a hollow silicon-based particle according to an embodiment of the present invention.
Figure 2:
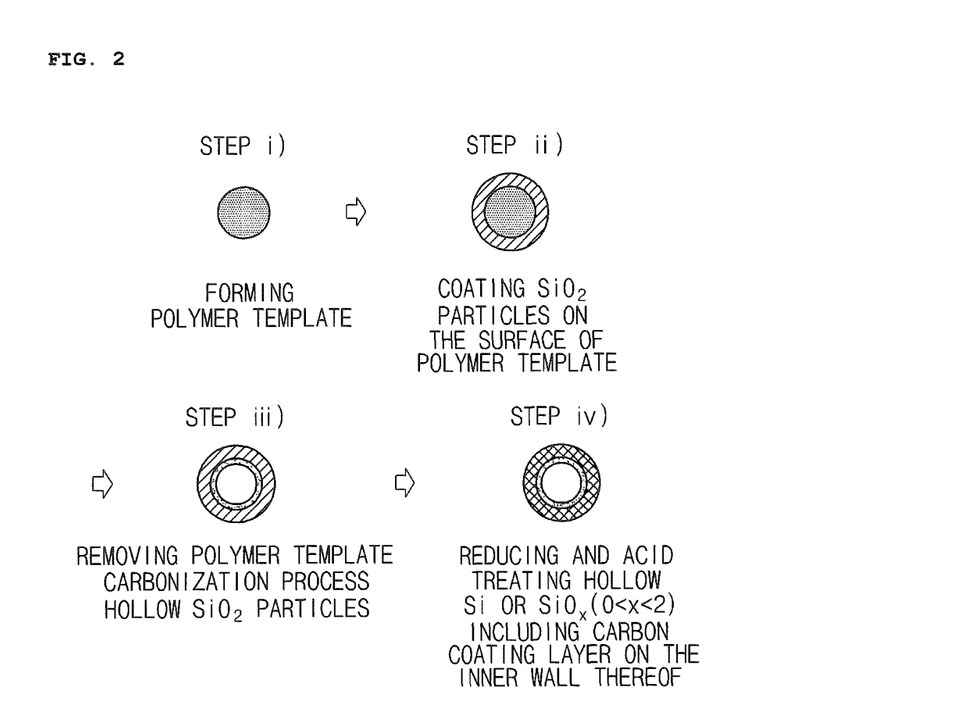
FIG. 2 illustrates a method for preparing a hollow silicon-based particle including a first carbon coating layer on the inner wall of silicon (Si) or silicon oxide ($SiO_x$, 0<x<2) particle according to an embodiment of the present invention.

A method for preparing the hollow silicon-based nanoparticle according to an embodiment of the present invention is illustrated in FIGS. 1 and 2, and will be explained in detail.

Referring to FIGS. 1 and 2, the hollow silicon-based particle according to an embodiment of the present invention may include the steps of i) preparing a polymer template; ii) coating the surface of the polymer template with $SiO_2$ particle using a silicon-based precursor; iii) obtaining hollow $SiO_2$ particle by removing the polymer template; and iv) obtaining hollow silicon (Si) or silicon oxide ($SiO_x$, 0<x<2) particle by reducing the hollow $SiO_2$ particle using an alkaline metal or an alkaline earth metal and acid treating the reduced product.

More particularly, the above step i) is for preparing a polymer template. The polymer template used according to an embodiment of the present invention may include at least one selected from the group consisting of polyacrylonitrile-based, polyethylene-based, polystyrene-based, polyvinyl chloride-based, poly(meth)acrylic acid-based, poly methyl (meth)acrylate-based, poly ethyl(meth)acrylate-based, poly butyl(meth)acrylate-based, poly hexyl(meth)acrylate-based, poly dodecyl(meth)acrylate-based, poly stearyl(meth)acrylate-based, poly benzyl(meth)acrylate-based, poly cyclohexyl (meth)acrylate-based, poly acrylamide-based and polyvinyl acetate-based polymers and polymers obtained by polymerizing vinyl-based monomer. Preferably, the poly acrylonitrile-based polymer may be used. The poly acrylonitrile-based polymer may preferably be poly(acrylonitrile-[2-(methacryloyloxy)ethyl]trimethylammonium chloride (P(AN-MTC)). Particularly, when the P(AN-MTC) forms the first carbon coating layer on the inner wall of the silicon (Si) or silicon oxide ($SiO_x$, 0<x<2) particle, high carbonization yield may be obtained, and P(AN-MTC) is more preferable.

According to an embodiment of the present invention, the polymer template may be manufactured by an emulsion polymerization using a polymerization initiator. For example, the P(AN-MTC) may be prepared by using acrylonitrile and [2-(methacryloyloxy)ethyl]trimethylammonium chloride (MTC) monomers with a polymerization initiator using water as a medium at 50° C. to 70° C. by an emulsion polymerization. The polymerization initiator is not specifically limited and may include, for example, (2,2'-azobis(2-methylpropionamidine)dihydrochloride (ALBA).

The above step ii) is for coating the surface of the polymer template with $SiO_2$ by mixing the polymer template with a silicon-based precursor.

The silicon-based precursor may be an aromatic silicon-based alkoxide compound or a linear silicon alkoxide compound. The polymer template and the silicon-based precursor may be mixed with an organic solvent, stirred for about 10 minutes to about 72 hours and dried to form $SiO_2$ on the surface of the polymer template.

The stirring may be conducted under the atmosphere or under an inert atmosphere such as argon, without limitation.

The organic solvent may be an alcohol or tetrahydrofuran (THF).

According to an embodiment of the present invention, the aromatic silicon alkoxide compound may preferably include at least one selected from the group consisting of phenyl triethoxysilane (PIES), phenyl trimethoxysilane (PTMS), diphenyl diethoxysilane (DDES) and diphenyl dimethoxysilane (DDMS).

The linear silicon alkoxide compound according to an embodiment of the present invention may preferably include at least one selected from the group consisting of tetraethyl orthosilicate (TEOS), tetramethyl orthosilicate (TMOS), tetrapropyl orthosilicate (TPOS) and tetrabutyl orthosilicate (TBOS). Preferably, TEOS, TMOS may be used.

According to an embodiment of the present invention, the aromatic silicon alkoxide compound or the linear silicon alkoxide compound may be used by 0.1 to 20 parts by weight and may preferably be used by 0.5 to 10 parts by weight based on 100 parts by weight of the organic solvent. In the case that the amount of the aromatic silicon alkoxide compound or the linear silicon alkoxide compound exceeds 20 parts by weight, the size of the $SiO_2$ particle formed on the surface of the polymer template may be nonuniform, and in the case that the amount is less than 0.1 parts by weight, hydrolysis may not be conducted, and the performance of processes may be difficult.

According to an embodiment of the present invention, the ratio of the silicon-based precursor:polymer template may be 1:1 to 19 by the weight.

The above step iii) is for forming hollow $SiO_2$ particle by removing the polymer template.

The forming of the hollow in the silicon particle by removing the polymer template may be conducted by heating at about 300° C. to about 1,400° C. to remove the polymer template.

FIG. 1 illustrates a method for preparing a hollow silicon-based particle, in which a hollow core part is formed in silicon or silicon oxide particle by removing a polymer template through heat treating under an atmospheric condition, and FIG. 2 is a method for preparing a hollow silicon-based particle including a first carbon coating layer on the inner wall of silicon (Si) or silicon oxide ($SiO_x$, $0<x<2$) by removing a polymer template through a carbonization process under an inert gas atmosphere.

In FIG. 1, the $SiO_2$ particle coated on the surface of the polymer template obtained in the above step ii) is heat treated at the atmospheric condition for 1 to 24 hours at 300° C. to 1,400° C., preferably, at 300° C. to 1,000° C., and more preferably, at 400° C. to 800° C. to remove the polymer template.

In FIG. 2, the $SiO_2$ particle coated on the surface of the polymer template obtained in the above step ii) is carbonized under an inert atmosphere such as argon, helium or nitrogen at 300° C. to 1,400° C., preferably, at 300° C. to 1,200° C., and more preferably, at 400° C. to 1,000° C. to remove the polymer template.

According to an embodiment of the present invention, a first carbon coating layer may be further formed on the inner wall of the silicon or silicon oxide particle by removing the polymer template by the carbonization process as shown in FIG. 2.

The above step iv) is for reducing silica ($SiO_2$) and acid treating. The hollow $SiO_2$ particle or the hollow $SiO_2$ particle including the first carbon coating layer on the inner wall thereof formed in the above step iii) is mixed with an alkaline metal or an alkaline earth metal, and heat treated under an inert atmosphere to reduce $SiO_2$. The reduction may preferably be conducted under an inert atmosphere such as argon, and the heat treating may be conducted at the temperature of 350° C. to 1,400° C., and preferably, 500° C. to 1,000° C. for 1 minute to 100 hours. When the heat treating conditions are deviated from the above conditions, the reduction of $SiO_2$ may be insufficient, or economic benefits by the excessive temperature for time may not be obtained.

The alkaline metal or the alkaline earth metal is used as the reducing agent according to an embodiment of the present invention. The alkaline metal may include lithium, sodium, potassium, rubidium, cesium or francium, and the alkaline earth metal may include beryllium, magnesium, calcium, strontium, barium or radium. The amount of the alkaline metal or the alkaline earth metal may be 10 wt % to 200 wt % based on the total amount of the hollow $SiO_2$ particle.

In addition, by acid treating the product thus reduced, hollow Si or $SiO_x$ ($0<x<2$) (FIG. 1), or hollow Si or $SiO_x$ ($0<x<2$) including a first carbon coating layer on the inner wall thereof (FIG. 2) may be obtained. The acid used for the acid treatment may include hydrochloric acid, sulfuric acid, phosphoric acid, acetic acid, nitric acid, etc., and these acids may be used as an acid aqueous solution state.

According to an embodiment of the present invention, the hollow silicon (Si) or silicon oxide ($SiO_x$, $0<x<2$) particle, and the hollow silicon-based particle including the first carbon coating layer on the inner wall of the particle manufactured in FIGS. 1 and 2, may be used as an anode active material. Alternatively, the outer wall of the (Si) or silicon oxide ($SiO_x$, $0<x<2$) particle manufactured in FIGS. 1 and 2 may be coated with carbon as shown in FIGS. 3 and 4, and hollow silicon-based particle further including a second carbon coating layer on the outer wall of the particle may be manufactured and used as an anode active material.

Figure 3:
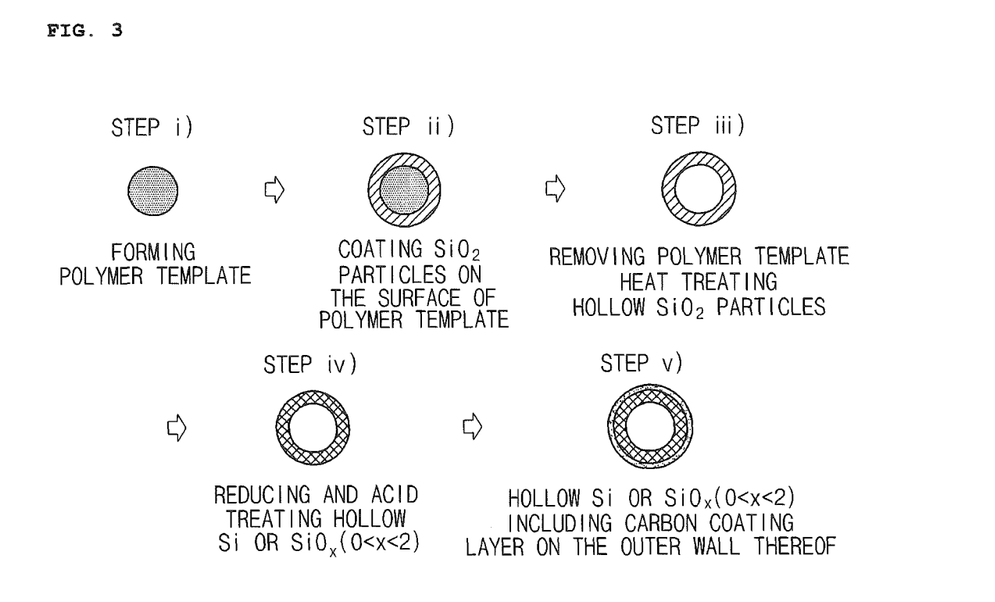
FIG. 3 illustrates a method for preparing a hollow silicon-based particle including a second carbon coating layer on the outer wall of silicon (Si) or silicon oxide ($SiO_x$, 0<x<2) particle according to an embodiment of the present invention.
Figure 4:
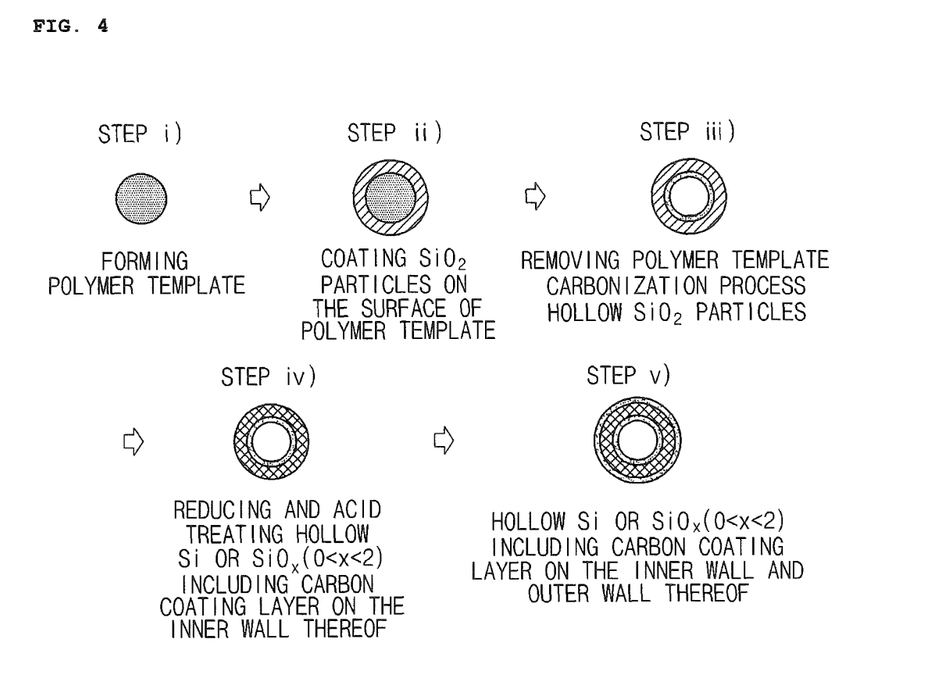
FIG. 4 illustrates a method for preparing a hollow silicon-based particle including first and second carbon coating layers on the inner wall and the outer wall of silicon (Si) or silicon oxide ($SiO_x$, 0<x<2) particle according to an embodiment of the present invention.

Particularly, as shown in FIGS. 3 and 4, after conducting the above step iv), a step of coating the outer wall of the hollow silicon (Si) or silicon oxide ($SiO_x$, $0<x<2$) particle with carbon by mixing the hollow silicon (Si) or silicon oxide ($SiO_x$, $0<x<2$) particle with a carbon precursor and heat treating may be further included so that a second carbon coating layer may be further included on the outer wall of the hollow silicon (Si) or silicon oxide ($SiO_x$, $0<x<2$) particle.

The carbon coating layer according to an embodiment of the present invention may be formed by dispersing the carbon precursor in a solvent, mixing the dispersion with the hollow silicon (Si) or silicon oxide ($SiO_x$, $0<x<2$) particle, drying and heat treating.

The carbon precursor may be any one that may produce carbon by the heat treatment without limitation, for example, pitch or a hydrocarbon-based material may be used. The hydrocarbon-based material may include furfuryl alcohol or a phenolic resin.

In addition, the solvent for forming the carbon coating layer may be, for example, THF or an alcohol, and the calcining for coating may be conducted in the heat treating temperature range of, for example, 300° C. to 1,400° C.

According to the preparation method of the hollow silicon-based particle of the present invention, a mass production is possible and production rate is fast when compared to a common CVD method or a VLS method, and it is favorable when considering processes or safety.

According to an embodiment of the present invention, hollow silicon-based particle prepared by the above-described method are provided.

In addition, the present invention includes an anode active material including the silicon-based particle.

Further, the present invention includes an anode including the anode active material.

The anode according to an embodiment of the present invention may be manufactured by a common method known in this art. For example, a slurry is prepared by mixing an anode active material including the hollow silicon-based particle with a solvent, and a binder and a conductive agent as occasion demands and stirring. Then, the slurry is coated on the current collector of a metal material, compressed and dried to manufacture an anode.

According to an embodiment of the present invention, the binder is used to bind the anode active material particle to maintain a molded body and includes polytetrafluoroethylene (PTFE), polyvinylidene fluoride (PVdF), styrene-butadiene rubber (SBR), etc. The binder is classified as a solvent-based binder (a binder using an organic solvent as a solvent) typically including PVdF and a water-based binder (a binder using water as a solvent) typically including at least one selected from the group consisting of an acrylonitrile-butadiene rubber, a SBR and an acryl rubber. The water-based binder is economic, eco-friendly, and harmless to a worker, and has high binding effect when compared to the solvent-based binder, and the ratio of the active material per equal volume may be increased in the water-based binder. Thus, high capacitance may be obtainable. As the water-based binder, the SBR is preferable.

According to an embodiment of the present invention, the anode of a lithium secondary battery may further include a viscosity increasing agent to control the viscosity. The viscosity increasing agent may be a cellulose-based compound and may include at least one selected from the group consisting of carboxymethyl cellulose (CMC), hydroxymethyl cellulose, hydroxyethyl cellulose and hydroxypropyl cellulose. According to an embodiment of the present invention, the preferred viscosity increasing agent is CMC.

According to an embodiment of the present invention, the conductive agent may include at least one selected from the group consisting of natural graphite, synthetic graphite, carbon black, acetylene black, ketjen black, channel black, furnace black, lamp black, thermal black, carbon nanotubes, fullerene, a carbon fiber, a metal fiber, carbon fluoride, aluminum, a nickel powder, zinc oxide, potassium titanate, titanium oxide and polyphenylene derivatives. Preferably, carbon black may be used.

The anode collector according to an embodiment of the present invention includes, for example, a foil manufactured by using copper, gold, nickel, a copper alloy or a combination thereof, without limitation.

In addition, the present invention provides a lithium secondary battery including a cathode, the above anode, a separator disposed between the cathode and the anode and an electrolyte including a lithium salt dissolved therein.

The lithium secondary battery according to an embodiment of the present invention may include common lithium secondary batteries such as a lithium metal secondary battery, a lithium ion secondary battery, a lithium polymer secondary battery or a lithium ion polymer secondary battery.

The lithium secondary battery of the present invention may be manufactured by a common method known in this art. For example, a lithium secondary battery may be manufactured by inserting a porous separator between a cathode and an anode and injecting an electrolyte including a lithium salt dissolved therein.

The cathode according to an embodiment of the present invention may be manufactured by a common method known in this art. For example, a slurry is prepared by mixing a cathode active material with a solvent, and a binder, a conductive agent, and a dispersing agent as occasion demands and stirring. Then, the slurry is coated on the current collector of a metal material, compressed and dried to manufacture a cathode.

The cathode is manufactured by coating the cathode active material on a cathode collector and drying. In this case, a lithium-containing transition metal oxide may be preferably used as the cathode active material and may include at least one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0≤y<1$), $Li_xNi_{1-y}Mn_yO_2$ ($0.5<x<1.3$, $0≤y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$) $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$). The lithium-containing transition metal oxide may be coated with a metal such as aluminum (Al) or a metal oxide. In addition, a sulfide, a selenide and a halide may be used other than the lithium-containing transition metal oxide.

The metal material of the current collector may be any metal having high conductivity and no reactivity in the voltage range of a battery, and to which the slurry of the electrode active material may be easily attached. The cathode collector may be a foil manufactured by aluminum, nickel or a combination thereof, without limitation.

The solvent for manufacturing the cathode may include an organic solvent such as N-methylpyrrolidone (NMP), dimethyl formamide (DMF), acetone, dimethyl acetamide, etc. and water. These solvents may be used alone or as a mixture of two or more. The amount of the solvent may be determined to a degree to sufficiently disperse the electrode active material, the binder, and the conductive agent considering the coated thickness of the slurry, the manufacturing yield, etc.

In addition, the separator may be a common porous polymer film used as a common separator, for example, a porous polymer film manufactured by using a polyolefin-based polymer such as ethylene homopolymer, propylene homopolymer, ethylene/butene copolymer, ethylene/hexene copolymer and ethylene/methacrylate copolymer, etc. The porous polymer film may be used alone or by stacking thereof. In addition, a common porous non-woven fabric, for example, a non-woven fabric obtained by using a glass fiber having a high melting point, a polyethyleneterephthalate fiber, etc., without limitation.

The lithium salt included in the electrolyte used in the present invention may be any one commonly used in an electrolyte for a lithium secondary battery, without limitation. For example the anion of the lithium salt may be one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_3P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte used in the present invention may include an organic liquid electrolyte, an inorganic liquid electrolyte, a solid polymer electrolyte, a gel type polymer electrolyte, a solid inorganic electrolyte, a molten type inorganic electrolyte, etc., that may be used when manufacturing a common lithium secondary battery, without limitation.

The appearance of the lithium secondary battery of the present invention is not specifically limited, and may be a cylindrical type using a can, a prismatic type, a pouch type or a coin type.

The lithium secondary battery of the present invention may be used as a power source of various electronic goods. The lithium secondary battery may be used in, for example, a portable telephone, a cellular phone, a game machine, a portable television, a laptop computer, a calculator, etc., without limitation.

Hereinafter, the present invention will be explained in more detail referring to example embodiments and comparative example embodiments. The present inventive may, however, be embodied in different forms and should not be construed as limited to the embodiments set forth herein. The exemplary embodiments of the present invention are provided for completely explain the present invention to a person having an average knowledge in this art.

Example 1: Preparation of a Hollow Silicon Oxide Particle

<Step (i): Preparing Polymer Template>

Acrylonitrile and MTC were used by 50:1 parts by weight, and water was used as a medium. Emulsion polymerization was conducted with 0.4 g of AIBA polymerization initiator at 60° C. for 18 hours. The product thus obtained was centrifuged to remove residual materials and obtain a polymer template of P(AN-MTC).

<Step (ii): Coating the Surface of Polymer Template with $SiO_2$>

The P(AN-MTC) prepared in the above step (i) and TEOS were mixed by the weight ratio of 1:1, and 1,400 g of ethanol was mixed thereto. The mixture thus obtained was stirred at room temperature for 5 minutes under an atmospheric condition, and a mixture of 34% aqueous ammonia solution and deionized water (DIW) was slowly added thereto by dropping, followed by stirring for 3 hours at room temperature until gelatin occurred. The gelled product was dried to obtain SiO$_2$ particle coated on the surface of a polymer template.

<Step (iii): Removing Polymer Template>

The coated SiO$_2$ particle on the surface of the polymer template obtained in the above step (ii) was heat treated under an atmospheric condition at 800° C. for 10 hours to remove the polymer template and obtain hollow SiO$_2$ particle having a hollow core part with a diameter of 300 nm.

<Step (iv): Forming a Hollow Silicon Particle>

50 g of the hollow SiO$_2$ particle obtained in the above step (iii) and 100 g of magnesium particle were mixed and heat treated at about 650° C. for 2 hours and 30 minutes under an argon atmosphere. The reactant was stirred in a 0.1 M aqueous hydrochloric acid solution for 24 hours and filtered using a filter paper to remove MgO. The product thus obtained was dried in an oven at 80° C. to obtain a hollow silicon oxide particle having a hollow core part with a diameter of 300 nm.

Example 2: Preparation of a Hollow Silicon Oxide Particle Including First Carbon Coating Layer on the Inner Wall Thereof <Step (iii): Carbonizing Polymer Template>

The SiO$_2$ particle coated on the surface of the polymer template obtained in the above step (ii) was carbonized by heat treating at 700° C. for 6 hours under an argon atmosphere. As a result, SiO$_2$ particle having a hollow core part with a diameter of 300 nm and including a first carbon coating layer on the inner wall thereof was obtained.

<Step (iv): Forming a Hollow Silicon Particle)>

50 g of the hollow SiO$_2$ particle including the first carbon coating layer on the inner wall thereof and obtained in the above step (iii) and 100 g of magnesium particle were mixed and heat treated at about 650° C. for about 2 hours and 30 minutes under an argon atmosphere. The reactant was stirred in a 0.1 M aqueous hydrochloric acid solution for 24 hours and filtered using a filter paper to remove MgO. The product thus obtained was dried in an oven at 80° C. to obtain a hollow silicon oxide particle including the first carbon coating layer on the inner wall of a hollow core part with a diameter of 300 nm.

Example 3: Manufacture of Anode and Lithium Secondary Battery

Manufacture of Anode

The hollow silicon particle obtained in Example 1 as an anode active material, super-P as a conductive agent, and PVdF as a binder were mixed by the weight ratio of 80:10:10 to prepare a homogeneous anode active material composition.

The anode active material composition thus obtained was coated on one side of a copper collector to a thickness of 65 μm, dried, compressed and punched to a certain size to manufacture an anode.

Manufacture of Lithium Secondary Battery

In a nonaqueous electrolyte solvent obtained by mixing ethylene carbonate and diethyl carbonate by the volume ratio of 30:70, LiPF$_6$ was added to prepare a 1 M LiPF$_6$ nonaqueous electrolyte.

A lithium metal foil was used as a counter electrode, and a polyolefin separator was disposed between two electrodes. Then, the electrolyte was injected to manufacture a coin type half cell.

Example 4: Manufacture of Anode and Lithium Secondary Battery

A coin type half cell was manufactured by conducting the same procedure described in Example 3 except for using the hollow silicon particle including the first carbon coating layer formed on the inner wall thereof, and manufactured in Example 2 as an anode active material.

Comparative Example 1

A coin type half cell was manufactured by conducting the same procedure described in Example 3 except for using silicon particle (Sigma-Aldrich) as an anode active material.

Experimental Example 1

<SEM Micro Photographic Images>

Figure 5:
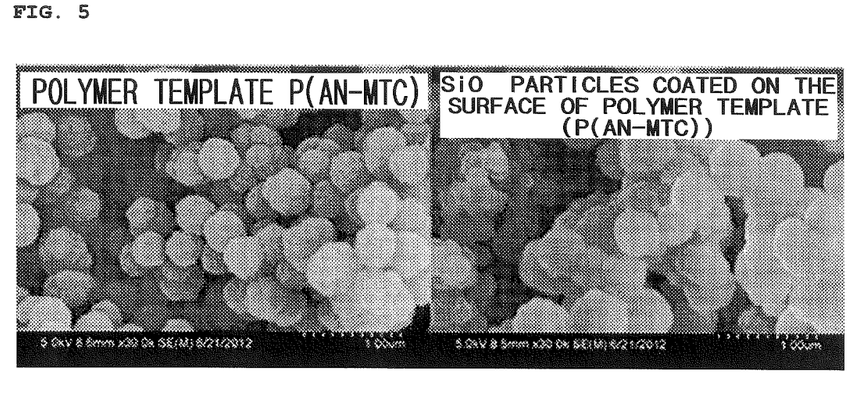
FIG. 5 illustrates SEM photographic images on 1) a polymer template before forming hollow and 2) $SiO_2$ particle coated on the surface of the polymer template.
Figure 6:
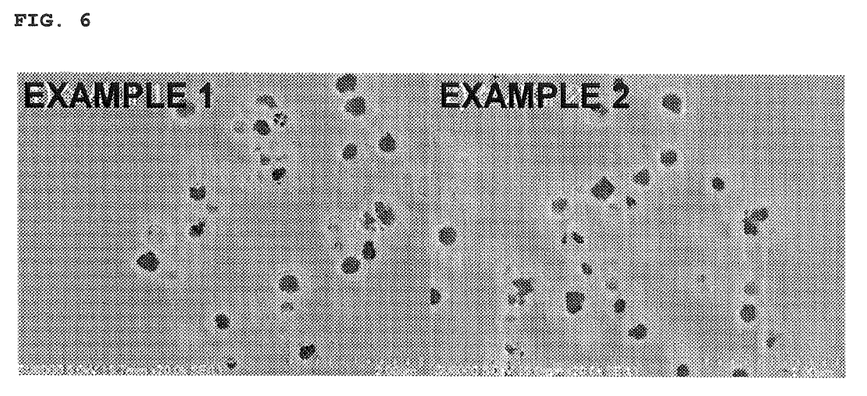
FIG. 6 illustrates SEM photographic images of the cross sections of hollow silicon-based particle prepared in Examples 1 and 2 of the present invention.

The products obtained in steps i) and ii) in Example 1, and the silicon particle obtained in Examples 1 and 2 were observed through SEM micro photographic images, and the results are illustrated in FIGS. 5 and 6.

In FIG. 5, 1) is a SEM photographic image of the surface of the P(AN-MTC) polymer template obtained in step i) of Example 1, and 2) is a SEM photographic image of the surface of SiO$_2$ particle coated on the surface of the P(AN-MTC) obtained in step ii) of Example 1.

As shown in FIG. 5, it may be secured that spherical polymer particle without hollow were formed.

In FIG. 6, 1) is a SEM photographic image of the cross section of the hollow silicon oxide particle obtained in Example 1, and 2) is a SEM photographic image of the cross section of the hollow silicon oxide particle including a first carbon coating layer on the inner wall thereof obtained in Example 2.

As shown in FIG. 6, it may be secured that hollow was formed in the silicon particle different from the SEM photographic image of FIG. 5.

Experimental Example 2

<Measure of Carbon Amount in a Hollow Silicon Oxide Particle>

The amount carbon was measured by using a carbon/sulfur amount analyzer (C/S analyzer) for each of the hollow silicon oxide particle obtained in Examples 1 and 2.

As a result, the amount of carbon in the hollow silicon oxide particle obtained in Example 1 was about 2 wt % with respect to the total amount of the hollow silicon particle, and the amount of carbon in the hollow silicon oxide particle including the first carbon coating layer was about 25 wt % with respect to the total amount of the hollow silicon particle.

Experimental Example 3

<Test of Capacity Properties>

To examine the capacity with respect to voltage level (V) and the capacity with respect to charge and discharge cycle of the coin type half cell manufactured in Example 3, the coin type half cell manufactured in Example 3 was charged at 23° C. with constant current (CC) conditions at 1.5 V with 0.1 C, and discharged with CC conditions at 0.005 V with 0.1 C, and capacity was measured. This procedure was repeated by 1 to 49 cycles. The results are shown in FIG. 7.

Figure 7:
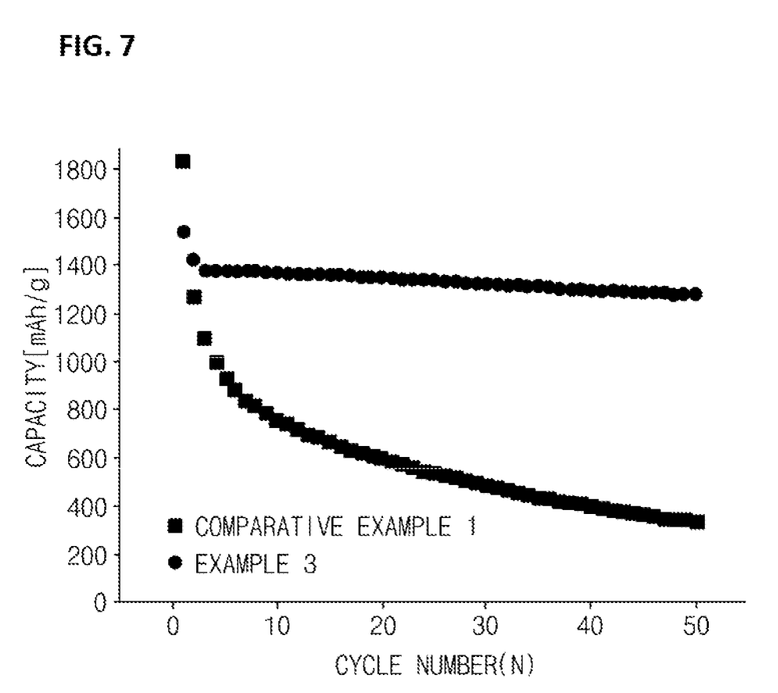
FIG. 7 is a graph illustrating capacity properties with respect to cycle number of a lithium secondary battery manufactured in Example 3 of the present invention.

As shown in FIG. 7, it may be secured that the coin type half cell manufactured in Example 3 of the present invention generates no charge change from $1^{st}$ to $49^{th}$ cycles. Since the most serious factor affecting the cycle properties is volume expansion, the defects concerning the volume expansion may be expected to be improved. On the contrary, for Comparative Example 1, the capacity is greatly decreased from $0^{th}$ to $5^{th}$ cycles, and about 3.5 times or more capacity was shown from $49^{th}$ cycle when compared to the result of Example 3.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for preparing hollow silicon-based particle, comprising the steps of:
  i) preparing a polymer template;
  ii) coating a surface of the polymer template with $SiO_2$ using a silicon-based precursor;
  iii) obtaining hollow $SiO_2$ particle by removing the polymer template; and
  iv) obtaining hollow silicon (Si) or silicon oxide ($SiO_x$, $0<x<2$) particle by reducing the hollow $SiO_2$ particle using an alkaline metal or an alkaline earth metal and acid treating the reduced product,
  wherein the polymer template is a polyacrylonitrile-based polymer, and
  wherein the poly acrylonitrile-based polymer is poly(acrylonitrile-[2-(methacryloyloxy)ethyl]trimethylammonium chloride) (P(AN-MTC)).

2. The method of claim 1, wherein the removing of the polymer template in step iii) is conducted by heat treating at 300° C. to 1,400° C.

3. The method of claim 2, wherein the removing of the polymer template in step iii) is conducted under an atmospheric environment.

4. The method of claim 2, wherein the removing of the polymer template in step iii) is conducted under an inert atmosphere.

5. The method of claim 1, further comprising a step of coating an outer wall of the hollow silicon (Si) or silicon oxide ($SiO_x$, $0<x<2$) particle with carbon by mixing the hollow silicon (Si) or silicon oxide ($SiO_x$, $0<x<2$) particle with a carbon precursor and heat treating after step iv).

6. The method of claim 5, wherein the carbon precursor is pitch or a hydrocarbon-based material.

7. The method of claim 5, wherein the heat treating is conducted at a temperature range of 300° C. to 1,400° C.

8. The method of claim 1, wherein the P(AN-MTC) is prepared by an emulsion polymerization using acrylonitrile and [2-(methacryloyloxy)ethyl]trimethylammonium chloride (MTC) as monomers at 50° C. to 70° C.

9. The method of claim 1, wherein the silicon-based precursor is an aromatic silicon alkoxide compound or a linear silicon alkoxide compound.

10. The method of claim 9, wherein the aromatic silicon alkoxide compound includes at least one selected from the group consisting of phenyl triethoxysilane (PTES), phenyl trimethoxysilane (PTMS), diphenyl diethoxysilane (DDES) and diphenyl dimethoxysilane (DDMS).

11. The method of claim 9, wherein the linear silicon alkoxide compound includes at least one selected from the group consisting of tetraethyl orthosilicate (TEOS), tetramethyl orthosilicate (TMOS), tetrapropyl orthosilicate (TPOS) and tetrabutyl orthosilicate (TBOS).

12. The method of claim 1, wherein a ratio of the silicon-based precursor:polymer template is 1:1 to 19 by the weight.

13. The method of claim 1, wherein the alkaline metal is lithium, sodium, potassium, rubidium, cesium or francium.

14. The method of claim 1, wherein the alkaline earth metal is beryllium, magnesium, calcium, strontium, barium or radium.

* * * * *